US012652440B2

(12) United States Patent
Chandrashekar et al.

(10) Patent No.: US 12,652,440 B2
(45) Date of Patent: *Jun. 9, 2026

(54) SYSTEMS AND METHODS TO IMPLEMENT PREFERRED SUBTITLE CONSTRUCTS

(71) Applicant: Adeia Guides Inc., San Jose, CA (US)

(72) Inventors: Padmassri Chandrashekar, Bangalore (IN); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,675

(22) Filed: May 23, 2023

(65) Prior Publication Data

US 2023/0291976 A1     Sep. 14, 2023

Related U.S. Application Data

(63) Continuation of application No. 17/245,589, filed on Apr. 30, 2021, now Pat. No. 11,700,430.

(51) Int. Cl.
*H04N 21/488* (2011.01)
*G06F 40/109* (2020.01)
*H04N 21/485* (2011.01)

(52) U.S. Cl.
CPC ....... *H04N 21/4884* (2013.01); *G06F 40/109* (2020.01); *H04N 21/4858* (2013.01)

(58) Field of Classification Search
CPC .......... H04N 21/4884; H04N 21/4858; H04N 21/4314; H04N 21/47202; H04N 21/4856; H04N 21/8543; H04N 21/8547
See application file for complete search history.

(56) References Cited

U.S. PATENT DOCUMENTS

| | | | |
|---|---|---|---|
| 9,571,870 B1 | 2/2017 | Wilson et al. | |
| 10,230,812 B1 * | 3/2019 | Ram .................... | H04L 65/612 |
| 11,700,430 B2 | 7/2023 | Chandrashekar et al. | |
| 2006/0253280 A1 | 11/2006 | Harband et al. | |
| 2012/0014674 A1 * | 1/2012 | Knight ................ | G11B 27/329 |
| | | | 386/326 |

(Continued)

FOREIGN PATENT DOCUMENTS

KR     20170058102     *  5/2017   ........... H04N 21/262

OTHER PUBLICATIONS

StackExchange thread, "Difference between RAM and buffer," dated Apr. 8, 2019, downloaded from https://cs.stackexchange.com/questions/106634/difference-between-ram-and-buffer (Year: 2019).*

(Continued)

*Primary Examiner* — Eric J Yoon
(74) *Attorney, Agent, or Firm* — HG LAW LLP

(57) ABSTRACT

Systems and methods are provided for applying attributes to subtitles. One example method includes accessing a subtitle file, wherein the subtitle file comprises one or more subtitles, and identifying an attribute to apply to at least a subset of the subtitles. The subtitle file is amended indicate an attribute to apply to at least a subset of the subtitles to create an amended subtitle file. At a computing device, the subtitles of the amended subtitle file are generated for display, wherein the attribute is applied to the subset of the subtitles.

20 Claims, 13 Drawing Sheets

(56)          References Cited

U.S. PATENT DOCUMENTS

| | | | | |
|---|---|---|---|---|
| 2013/0209058 A1* | 8/2013 | Cho | .................. | H04N 21/4884 |
| | | | | 386/230 |
| 2013/0242189 A1 | 9/2013 | Franklin et al. | | |
| 2015/0382064 A1* | 12/2015 | Aravamudan | ..... | H04N 21/4755 |
| | | | | 725/37 |
| 2016/0323387 A1* | 11/2016 | Heller | ................ | H04L 63/0876 |
| 2020/0007948 A1* | 1/2020 | Li | ...................... | H04N 5/44504 |
| 2020/0135225 A1 | 4/2020 | Vaughn et al. | | |
| 2021/0067836 A1 | 3/2021 | Hornsby et al. | | |
| 2022/0353585 A1 | 11/2022 | Chandrashekar et al. | | |

OTHER PUBLICATIONS

3wisemonkeys website, "Portable TVs, A Buyer's Guide," dated by the waybackmachine for Oct. 20, 2020, downloaded from https://3wisemonkeys.co.uk/buyers-guides/portable-tv-buyers-guide/ (Year: 2020).*

Website Motion Array website, "Easily Create Text Animations and Effects in Premiere Pro," published Feb. 9, 2021, downloaded from https://motionarray.com/learn/premiere-pro/premiere-pro-text-animation-tutorial/ (Year: 2021).

Youtube video by username Learn How to Edit Stuff, "Animated Subtitle Tutorial," published Dec. 20, 2020, downloaded from https://www.youtube.com/watch?v=AnqwggZpqYs (Year: 2020).

* cited by examiner

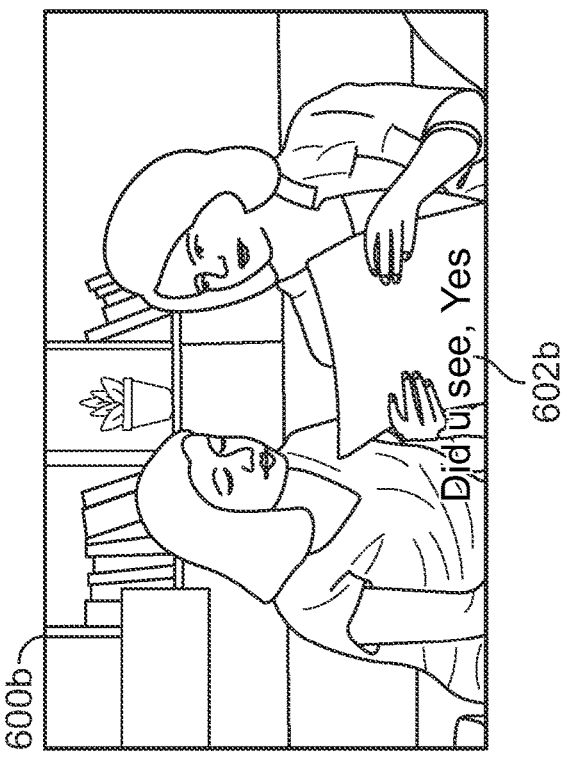
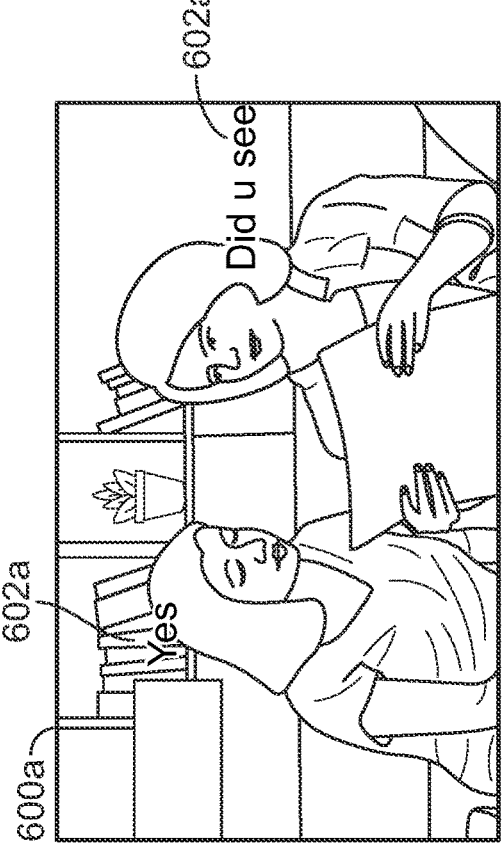
FIG. 6

700 —

```
<?xml version="1.0"encoding="utf-8"?>
<tt xmlns="http://www.w3.org/ns/ttml" xmlns:ttp="http://www.w3.org/ns/ttml#parameter"
xmlns:tts="http://www.w3.org/ns/ttml#styling" xmlns:ttm="http://www.w3.org/ns/ttml#metadata"
xmlns:xml="http://www.w3.org/XML/1998/namespace" ttp:timeBase="media" ttp:frameRate="24"
xml:lang="en">
<head>
<metadata>
<ttm:title>Sample TTML</ttm:title>
</metadata>
<styling>                                                          ⌐706
<style xml:id="s1" tts:textAlign="center" tts:fontFamily="Arial" tts:fontSize="100%"/>
</styling>
<layout>
<region xml:id="bottom" tts:displayAlign="after" tts:extent="80% 40%" tts:origin="10% 50%"/>
<region xml:id="top" tts:displayAlign="before" tts:extent="80% 40%" tts:origin="10% 10%"/>
<layout>
</head>
<body region="bottom" style="s1">
<div>                    ⌐702        ⌐704      ⌐706  ⌐708          ⌐710
<p xml:id="subtitle1" begin="00:00:01.375" end="00:00:05.750" style="s1" region="top" >TOP SAMPLE
TEXT</p>
<p xml:id="subtitle2" begin="00:00:05.916" end="00:00:10.216" style="s1" >BOTTOM SAMPLE TEXT</P>
<p xml:id="subtitle3" begin="00:00:10.418" end="00:00:15.083" style="s1" region="top" >Top Hello</P>
<p xml:id="subtitle4" begin="00:00:15.391" end="00:00:20.558" style="s1" >Bottom Hello</P>
<p xml:id="subtitle5" begin="00:00:20.750" end="00:00:25.041" style="s1" >He had a great story.</P>
<p xml:id="subtitle6" begin="00:00:25.875" end="00:00:30.166" style="s1" >- Did he tell you what it was
about?<br/>- He did.</p>
<p xml:id="subtitle7 begin="00:00:30.416" end="00:00:35.558" style="s1" >in 1992, a shipping
Container<br/>fell overboard</p>
<p xml:id="subtitle8" begin="00:00:35.858" end="00:00:40.091" style="s1" >on its way from China</P>
<p xml:id="subtitle9" begin="00:00:40.341" end="00:00:45.133" style="s1" >to the United
States,<br/>releasing 29,000 rubber ducks</P>
<p xml:id="subtitle10" begin="00:00:45.325" end="00:00:50.041" style="s1" >into the Pacific Ocean.</P>
</div>
</body>
</tt>
```

FIG. 7

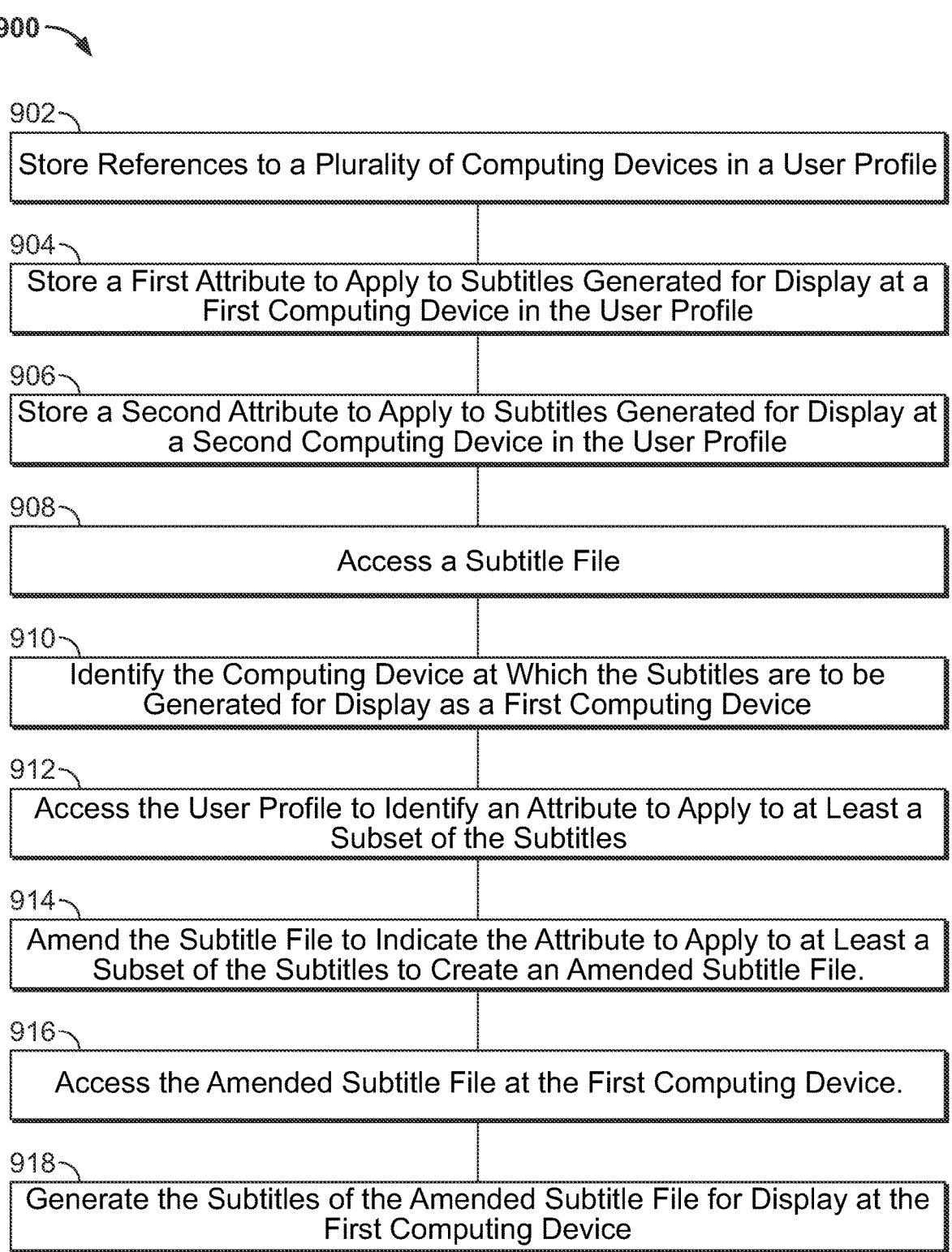

900

902

Store References to a Plurality of Computing Devices in a User Profile

904

Store a First Attribute to Apply to Subtitles Generated for Display at a First Computing Device in the User Profile

906

Store a Second Attribute to Apply to Subtitles Generated for Display at a Second Computing Device in the User Profile

908

Access a Subtitle File

910

Identify the Computing Device at Which the Subtitles are to be Generated for Display as a First Computing Device

912

Access the User Profile to Identify an Attribute to Apply to at Least a Subset of the Subtitles

914

Amend the Subtitle File to Indicate the Attribute to Apply to at Least a Subset of the Subtitles to Create an Amended Subtitle File.

916

Access the Amended Subtitle File at the First Computing Device.

918

Generate the Subtitles of the Amended Subtitle File for Display at the First Computing Device

FIG. 9

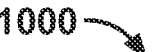
1000
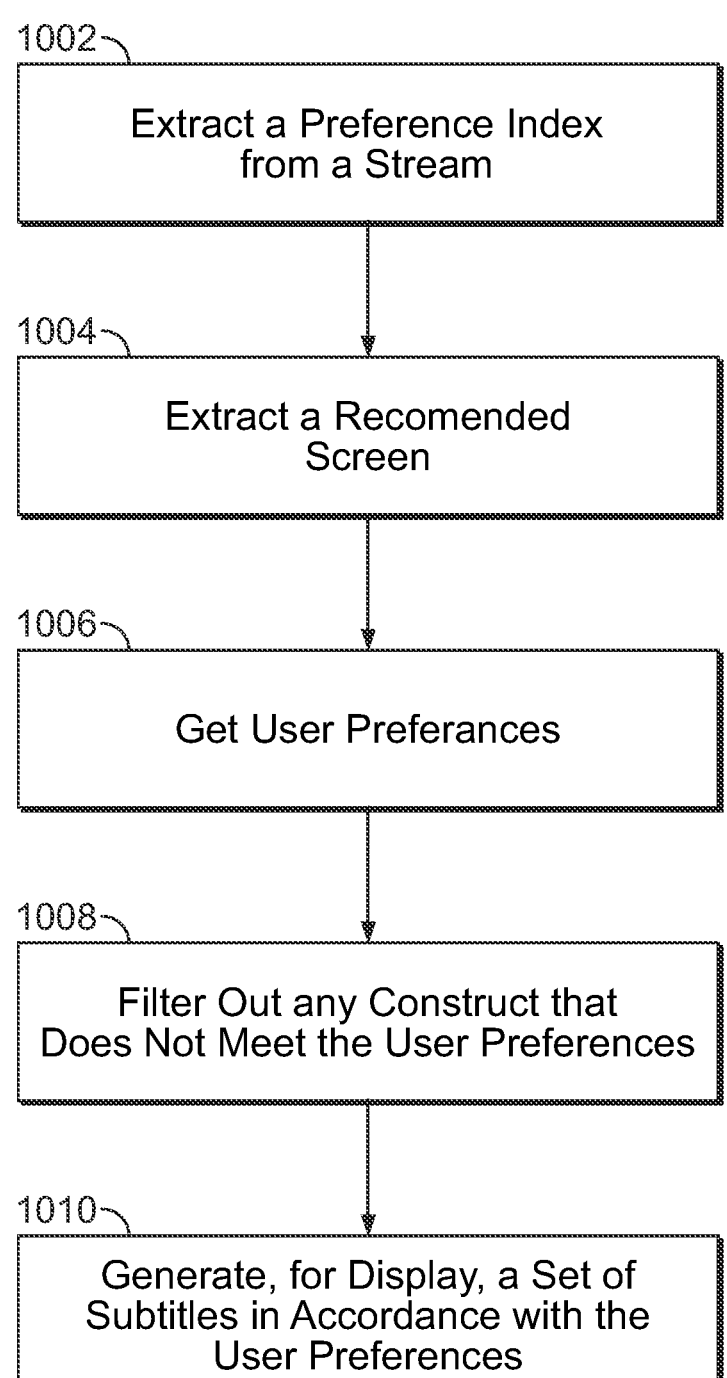
1002
Extract a Preference Index
from a Stream
1004
Extract a Recomended
Screen
1006
Get User Preferances
1008
Filter Out any Construct that
Does Not Meet the User Preferences
1010
Generate, for Display, a Set of
Subtitles in Accordance with the
User Preferences
FIG. 10

SYSTEMS AND METHODS TO IMPLEMENT PREFERRED SUBTITLE CONSTRUCTS

CROSS REFERENCE TO RELATED APPLICATIONS

This application is a continuation of U.S. patent application Ser. No. 17/245,589, filed Apr. 30, 2021, the disclosures of which is hereby incorporated by reference herein in its entirety.

BACKGROUND

The present disclosure is directed towards systems and methods for enabling a user to customize subtitles that are generated for display at a computing device. In particular, systems and methods are provided herein that enable a user to set an attribute that is applied to a subtitle file, so that a user can implement their preferred subtitle construct for generating subtitles for display at one or more computing devices, independent of the subtitle source.

SUMMARY

With the proliferation of video on demand and video streaming services, there has been an increase in both the number of people viewing video content and the variety of different screens that are used to view the video content. For example, a single streaming service may be viewable on, or via a screen attached to, a number of different computing devices. These computing devices may include a set-top-box, a smart television, a smartphone, a tablet and/or a web browser running on a computing device such as a laptop and/or PC. In addition to this, many streaming services also enable a user to watch content in a picture-in-picture mode, where video content is displayed in a smaller area that is overlaid on other content being displayed on a screen of, or attached to, the computing device. When watching video content, a user may wish to enable subtitles to be displayed on a screen attached to the computing device. Subtitles may make use of different constructs, including, for example, animations, the region of the screen on which they are displayed and/or different styles, which will cause the subtitles to be rendered in a specific manner on the screen of, or attached to, the computing device. However, users may, for example, find excessive animations distracting, find that having subtitles displayed in different regions of the screen is confusing and/or wish to highlight certain subtitle elements such as, for example, audio description, to make them more obvious.

In view of the foregoing, it would be beneficial to have a system that is capable of providing users with the option of enabling and/or disabling different attributes to be applied to subtitles that are rendered on a screen of, or attached to, a computing device.

Systems and methods are described herein for applying attributes to subtitles. In accordance with an aspect of the disclosure, a method is provided for applying attributes to subtitles. The method includes accessing a subtitle file, wherein the subtitle file comprises one or more subtitles, and identifying a first attribute to apply to at least a subset of the subtitles. The subtitle file is amended to indicate a first attribute to apply to at least a subset of the subtitles to create an amended subtitle file. The amended subtitle file is accessed at a computing device. At the computing device the subtitles of the amended subtitle file are generated for display, wherein the first attribute is applied to the subset of the subtitles. The subtitle file may comprise an original attribute to apply to at least a subset of the one or more subtitles, and the identified first attribute to apply may be removing the original attribute. The subtitle file may be parsed to identify the original attribute. For example, the subtitle file may be parsed to identify one or more sound effects, which are identified in a particular manner. A sound effect may be identified in the subtitle file via square brackets, "[" and "]" and/or via the use of capital letters. The parsing may comprise identifying the square brackets and/or the use of capital letters in order to identify sound effects identified in this manner. The subtitle file may be amended to remove the original attribute from the subtitles. The first attribute to apply to the subtitles may be stored at the computing device and may be accessible by programs running on the computing device. Identifying a first attribute to apply to at least a subset of the subtitles may further comprise a first program running on the computing device accessing the stored first attribute. Amending the subtitle file may further comprise the first program running on the computing device amending the subtitle file to indicate that the identified first attribute should be applied to at least a subset of the subtitles to create an amended subtitle file. In one example, amending the subtitle file may comprise creating an amended subtitle file by amending the accessed subtitle file, such that the accessed subtitle includes the attribute to apply to at least a subset of the subtitles. In another example, amending the subtitle file may comprise creating a new and distinct subtitle file from the accessed subtitle file, such that the accessed subtitle file remains unamended (or unedited) and the new subtitle file includes the attribute to apply to apply to at least a subset of the subtitles. Generating the subtitles for display further may comprise the first program generating the subtitles for display at the computing device. In this manner a user can set a global setting for a preferred subtitle construct, on a computing device, which is accessible by any programming running on the computing device. In another example, code snippets may be generated at the computing device that enable programs running on the computing device to apply attributes to subtitles and subsequently generate them for display. In other examples, the user may adjust a plurality of settings to apply multiple preferred subtitle constructs to subtitles. These settings may comprise applying multiple attributes to the subtitles, including adding attributes to the subtitle file, modifying existing attributes and/or removing existing attributes from the subtitle file. For example, the user may enable a global setting to force all subtitles to be displayed at the top of the screen of the tablet device. The user may then proceed to open a video container, such as an audio video interleave container (.avi) or a Matroska multimedia container (.mkv), with the tablet device. On opening the video container, the tablet device may access the video file, the audio file and the subtitle file contained within the container. The subtitle file is a file that contains subtitles, and optionally, attributes for generating subtitles for display on a display that is integral to, or is attached to, a computing device. On accessing the subtitles, the tablet device may identify that the user has set a setting to force the subtitles to be displayed at the top of the screen of the tablet device. In order to apply this setting, the tablet device may amend the subtitle file to add an attribute that causes the subtitles to be displayed at the top of the screen. This step may take place entirely in a buffer, such that the original subtitle file remains unedited, and the edited version of the file may be discarded once the user has finished watching the video. Alternatively, the tablet device may directly edit the original subtitle file, such that an edited subtitle file is stored in a memory of the tablet device and the edited subtitle file is retained. The tablet device may access the edited subtitle file and generate the subtitles for display at the top of the screen of the tablet device. In addition to generating the subtitles for display, the tablet device may also display the subtitles on a screen of the tablet device. In some examples, a media player running on a computing device may perform one or more of the aforementioned method steps. In some examples, a user may set an attribute, or attributes, that disable subtitle animations for regular dialog, but enable subtitle animations for audio description subtitles (e.g., [THUNDER BOOMS]). As discussed above, the subtitle file may be parsed in order to identify the attribute or attributes. This may, where subtitle animations are already indicated in the subtitle file, alter existing subtitle attributes or, where subtitle animations are not already indicated in the subtitle file, add one or more attributes to existing subtitles in the subtitle file. In another example, a subtitle file may be amended so that the text of a single subtitle is generated for display with more than one attribute. For example, the text "Happy Fourth of July!" may be animated so that it is displayed in red for one second, green for two seconds and blue for three seconds.

The subtitle file may be accessed at a server and amended at the server. The amended subtitle file may be received at the computing device, from the server, via a network. The subtitle file may be accessed at the server from an over-the-top content provider. In an example system, a user may sign up to a web service in order to set a preferred subtitle construct for all over-the-top content that is delivered to, for example, a smart television. Over-the-top content includes video content that is streamed live and video content that is accessible on demand via a network such as the internet. A user may use the web service to enable a setting to remove animations from any subtitle file that is sent to the smart television as part of a stream from an over-the-top content provider. The web service may comprise a server that receives video content comprising subtitles from one or more over-the-top service providers via the internet. The subtitle component of the stream may be amended at the server in accordance with the setting, i.e., removing any animations from the subtitle file, and the server may re-transmit the stream, comprising the amended subtitle file, to the smart television via the internet. The server may cache the amended subtitle file and the amended subtitle file may be served (if compatible and/or requested) in response to requests from subsequent users. For example, an over-the-top content provider may receive media content from a broadcaster and the over-the-top content provider may wish to amend subtitle file, such that all subtitles that were originally indicated to displayed at the top of a display are indicated to be displayed at the bottom of a display. In this example, the subtitle file may be amended once and the amended subtitle file may be stored in a cache, such as on a hard drive of a server or in a random access memory of the server, and transmitted to all, or at least a sub-set, of users who request the media content. In this example, when the smart television generates the subtitles for display, the subtitles are generated without any animations. In other example systems, existing subtitle animations may be modified and/or removed entirely.

The identified first attribute may include at least one of a content element attribute, a timing attribute, a style attribute, a layout attribute, an animation attribute, a metadata attribute, a color attribute, a font size attribute, a font weight attribute and/or a text alignment attribute. The identified attribute may include any known attribute that can be applied to a subtitle. A single attribute may be applied to a subtitle and/or multiple attributes may be applied to a subtitle. A subtitle file may comprise a plurality of subtitles. Any one attribute and/or mix of attributes may be applied to all of the subtitles of the subtitle file and/or to only a subset of the subtitles of the subtitle file.

The first attribute to apply to the subtitles may be stored in a user profile, and the user profile may be accessed to identify the first attribute to apply to the subtitles. References to a plurality of computing devices may be stored in a user profile. The first attribute to apply to subtitles generated for display at a first computing device of the plurality of different computing devices may be stored in the user profile. A second attribute to apply to subtitles generated for display at a second computing device of the plurality of computing devices may be stored in the user profile. The computing device at which the subtitles are to be generated for display may be identified as the first computing device. Identifying a first attribute may further comprise accessing the user profile to identify the first attribute to apply to the subtitles to be generated for display at the first computing device. Accessing the amended subtitle file may further comprise accessing the amended subtitle file at the first computing device. Generating the subtitles of the amended subtitle file for display may further comprise generating the subtitles for display at the first computing device. In an example system, a user may enable a setting to allow subtitles to be animated when they are watching content on a smart television, and the user may enable a setting preventing subtitles from being animated when they are watching content on a smartphone. The settings may be applied to a group of devices, such as "all smart televisions" and/or may be applied to single devices such as "Ann's smartphone." The profile may, for example, be associated with an over-the-top content provider, so that when a user logs in to a device, their settings are identified at the same time. The computing device that a user is logged in to may amend the subtitle file and generate the subtitles for display in accordance with the attributes identified by the setting associated with the computing device.

A subtitle file may be accessed at a first computing device. Identifying a first attribute may further comprise identifying, at the first computing device, a first attribute to apply to at least a subset of the subtitles to be generated for display at a second computing device. The subtitle file may be amended at the first computing device. The amended subtitle file may be transmitted from the first computing device to the second computing device. Generating the subtitles for display may further comprise generating the subtitles for display at the second computing device, wherein the first attribute is applied to the subset of the subtitles. In another example, the subtitle file may be accessed at a first computing device, and the subtitle file may be transmitted from the first computing device to a server. The identifying a first attribute may further comprise identifying, at the server, a first attribute to apply to at least a subset of the subtitles to be generated for display at a second computing device. The subtitle file may be amended at the server. The amended subtitle file may be transmitted from the server to the second computing device. Generating the subtitles for display may further comprise generating the subtitles for display at the second computing device, wherein the first attribute is applied to the subset of the subtitles. In an example system, a user may start watching a video program on a smart television but decide to continue watching it on a smartphone. The user may be happy for subtitles to be displayed on different locations of the screen of the smart television but may wish for the subtitles to be displayed only at the bottom of the screen when watching a video on the smartphone. The user may set a setting that indicates that the subtitles should be displayed only at the bottom of the screen when resuming a program on a smartphone. In this example, the smart television may amend the subtitle file to remove the attribute that causes the subtitles to be displayed in different locations on the screen before the subtitle file is transmitted to the smartphone. In another example, a server may receive the subtitle file and may amend the subtitle file in order to remove the attribute that causes the subtitles to be displayed on different locations on the smartphone screen. The server may then transmit the subtitle file to the smartphone. The smartphone may then generate the subtitles for display at the bottom of the screen of the smartphone. The first computing device and the second computing device may be located on the same network, for example, a home network comprising a router and wired and/or wireless connections between the computing devices. In another example, the first computing device may be connected to a home network and the second computing device may be connected to a cellular network. The server may be a local server that is connected to a home network. In another example, the server may be remote server that is accessed by, for example, the internet. In other example systems, existing subtitle animations may be modified and/or removed entirely.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 6 shows an example output from an amended subtitle file, in accordance with some embodiments of the disclosure;

FIG. 7 shows an example subtitle file format, in accordance with some embodiments of the disclosure;

FIG. 9 is a flowchart of illustrative steps involved in applying attributes to subtitles at a second computing device, in accordance with some embodiments of the present disclosure; and FIG. 10 is a flowchart of illustrative steps involved in applying attributes to subtitles, in accordance with some embodiments of the present disclosure.

DETAILED DESCRIPTION

Figure 1:
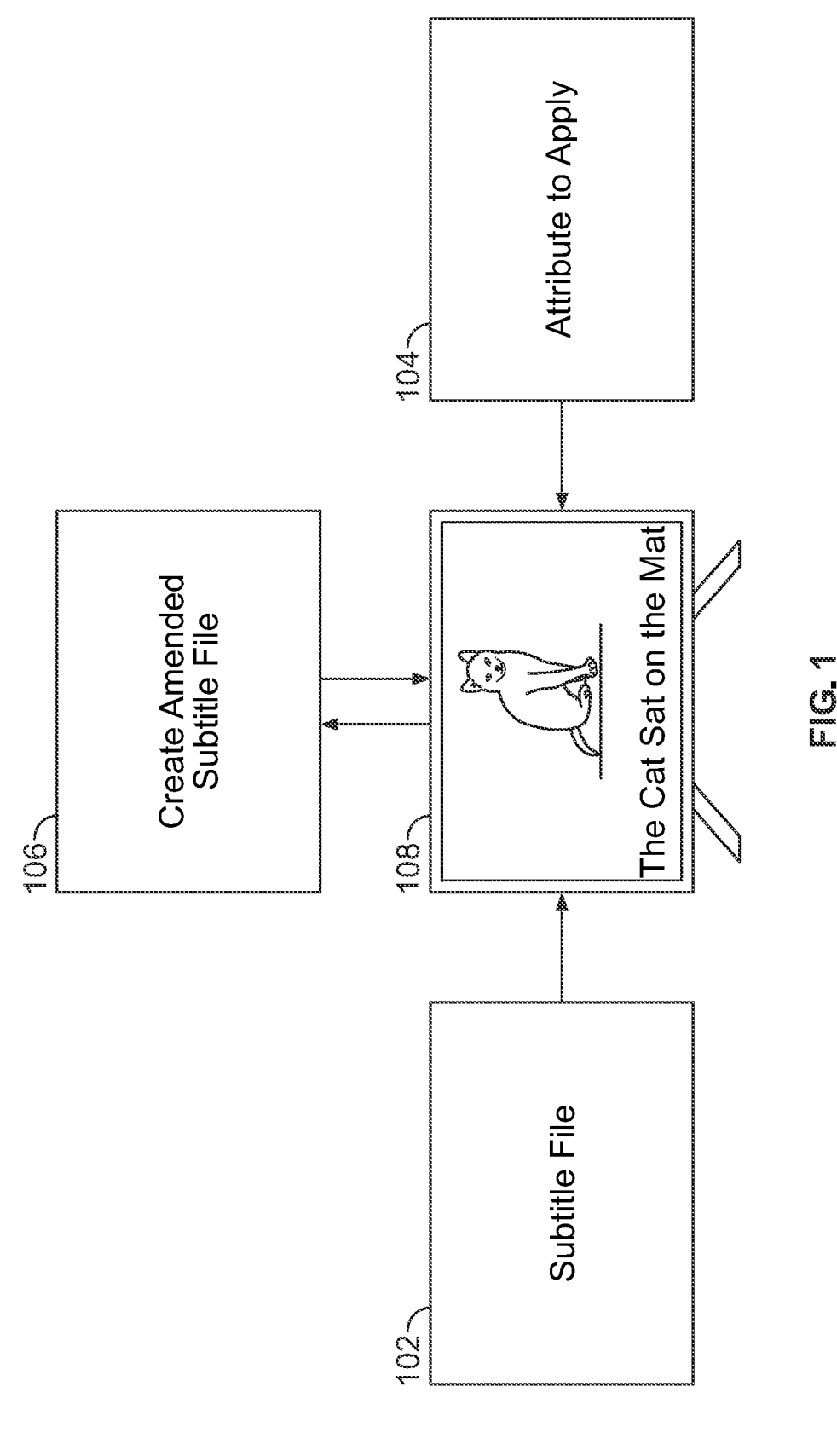
FIG. 1 shows an exemplary environment in which a subtitle file is amended to associate subtitles with an identified attribute, in accordance with some embodiments of the disclosure.

Systems and methods are described herein for applying attributes to subtitles. As referred to herein, subtitles include any text that reflects the audio content of a media asset. This includes, for example, spoken dialogue. This may also include, for example, non-dialogue information that is related to the media content, including, for example, audio description that describes sounds such as sirens. Subtitles may be in a language that is different from the language of the audio content, including, for example, a translation of the audio content.

Subtitles may be stored in a subtitle file. A subtitle file is any file that indicates text to be generated for display on the display of, or a display attached to, a computing device and the relative time at which the text should be displayed. A subtitle file may be stored within a media container, such as an audio video interleave container (.avi) or a Matroska multimedia container (.mkv), along with one or more corresponding video and/or audio files. Typically, a subtitle file may contain a time stamp, or time code, to indicate when a subtitle should be generated for display with respect to corresponding video and/or audio content. In use, a computing device may access video content and a subtitle file. The computing device may display the video content with the subtitles of the subtitle file overlaid on the video content. A subtitle file may be in any suitable file format, including: text (.txt), SubRip (.srt), SubViewer (.sbv or .sub), MPsub (.mpsub), LRC (.lrc), Videotron Lambda (.cap), SubStation Alpha (.ssa), Synchronised Accessible Media Interchange (.smi or .sami), RealText (.rt), WebVTT (vtt), Timed-Text Markup Language (.ttml), Distribution Format Exchange Profile (.ttml or .dfxp), Scenarist Closed Caption (.scc), EBU-STL (.stl), Caption Center (.tds), Captions Inc. (.cin), Cheetah (.cap), NCI (.cap), CEA-708, DVB Teletext, DVB Subtitles and/or 608. Any subtitle file format used for streaming, video-on-demand and/or digital broadcast content may be used. In addition to the text for display and the time stamp, the subtitle file may also include attributes to be applied to the subtitles when they are displayed, such as position and style information.

The attributes that may be applied to a subtitle include content elements, such as HTML-like attributes, like <div>, <p>, <span>, and timing attributes that indicate the time interval during which the subtitle (and/or any layout or animations applied to the subtitles) should be visible. The attributes may also include style attributes that indicate the appearance of subtitles, such as text color, text size, text font, text weight, text alignment, text border color, text border thickness and/or text background color. The attributes may also include layout attributes that indicate the layout properties of the subtitles, such as the position of the subtitles on the display of, or attached to, the computing device. The attributes may also include animation attributes that may alter the style of the subtitles at different times, for example causing the subtitles to flash, change color and/or move about the display. The attributes may also include metadata attributes that specify additional metadata about the presentation of the subtitles.

A media asset can comprise any media content. The media content may be streamed live and/or streamed on demand to a computing device. On-demand content may also be downloaded to a computing device in response to a user request and/or according to a pre-set rule. Content includes audio, video and/or any other media content. Audio includes audio-only content, such as songs. Video includes audiovisual content such as movies and/or television programs. An over-the-top content platform may be accessed via a website and/or an app running on a computing device.

The disclosed methods and systems may be implemented on a computing device. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, an augmented reality device, a mixed reality device, a virtual reality device, or any other television equipment, computing equipment, or wireless device, and/or combination of the same.

As discussed herein, amending the subtitle file may comprise creating an amended subtitle file by amending the accessed subtitle file, such that the accessed subtitle includes the attribute to apply to at least a subset of the subtitles. Amending the subtitle file may also comprise creating a new and distinct subtitle file from the accessed subtitle file, such that the accessed subtitle file remains unamended (or unedited) and the new subtitle file includes the attribute to apply to apply to at least a subset of the subtitles.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an exemplary environment in which a subtitle file is amended to associate subtitles with an identified attribute, in accordance with some embodiments of the disclosure. A user sets an attribute, or attributes, to apply to subtitles generated for display at a first computing device, such as a smart television 100. In this example, the user sets a setting to always display subtitles at the bottom of the screen. When the smart television 100 accesses a subtitle file 102, for example a subtitle file 102 that is associated with a media asset accessed from a local storage device, the smart television 100 identifies an attribute to apply 104 to the subtitles. In this example, the attribute to apply is to apply position information to the subtitles such that they are generated for display, and displayed, at the bottom of the screen of the smart television 100. In this example, the smart television 100 amends the subtitle file to remove any existing position attributes that would cause the subtitles to be displayed at a position other than at the bottom of the screen and creates an amended subtitle file 106. In this example, the amended subtitle file is stored in a temporary buffer and discarded once the user has finished accessing the media asset; however, in other examples, the amended subtitle file may be stored on the local storage device and retained once the user has finished accessing the media asset. The smart television 100 generates the subtitles for display and displays the subtitles 108 at the bottom of the screen of the smart television 100.

Figure 2A:
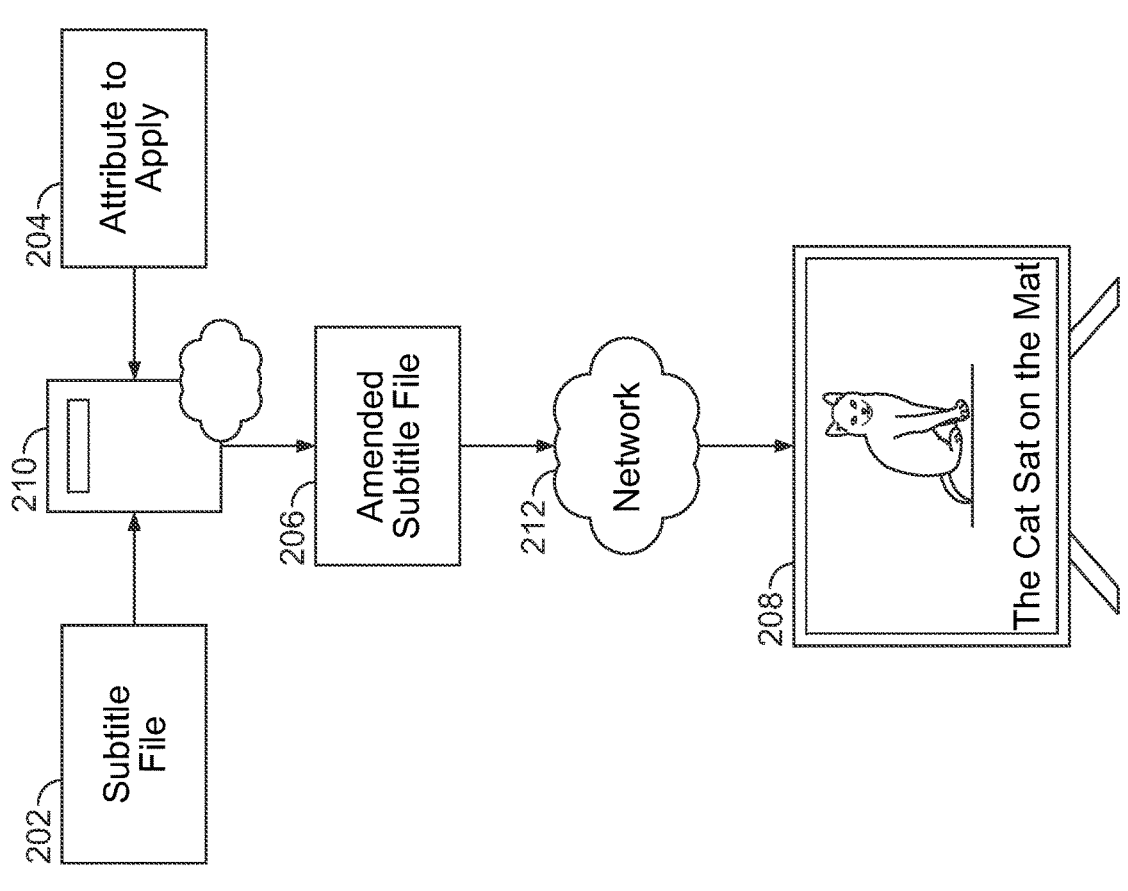
FIG. 2A shows an exemplary environment in which a subtitle file is amended at a server to associate subtitles with an identified attribute, in accordance with some embodiments of the disclosure.

FIG. 2A shows an exemplary environment in which a subtitle file is amended at a server to associate subtitles with an identified attribute, in accordance with some embodiments of the disclosure. A user sets an attribute, or attributes, to apply to subtitles generated for display at a first computing device, such as a smart television 200. In this example, the user sets a setting to always display subtitles at the bottom of the screen. When a user accesses a media asset comprising a subtitle file 202, the associated subtitle file 202 is sent to a server 210. The server 210 identifies an attribute to apply 204 to the subtitles. In this example, the attribute to apply is to apply position information to the subtitles such that they are generated for display, and displayed, at the bottom of the screen of the smart television 200. In this example, the server 210 amends the subtitle file to remove any existing position attributes that would cause the subtitles to be displayed at a position other than at the bottom of the screen of the smart television 200 and creates an amended subtitle file 206. The amended subtitle file 206 is sent via a communications network 212 to the smart television 200. The communications network 212 may include the internet and/or a local network and may include wired and/or wireless components. The server may cache the amended subtitle file and the amended subtitle file may be served in response to requests from subsequent users. In this example, the amended subtitle file is received at the smart television 200 and is stored in a temporary buffer and discarded once the user has finished accessing the media asset; however, in other examples, the amended subtitle file may be stored on the local storage device and retained once the user has finished accessing the media asset. The smart television 200 generates the subtitles for display and displays the subtitles 208 at the bottom of the screen of the smart television 200.

Figure 2B:
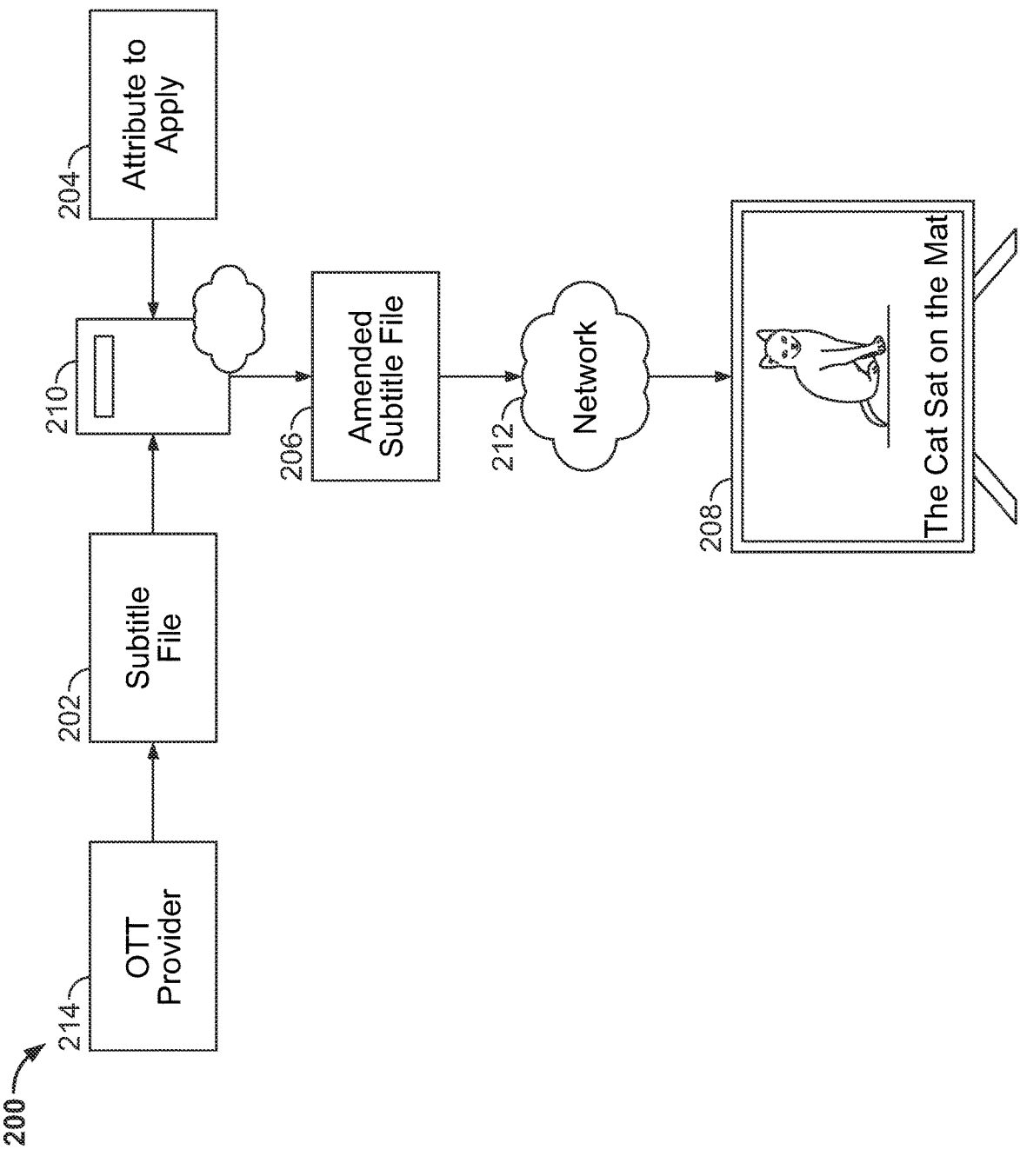
FIG. 2B shows another exemplary environment in which a subtitle file is amended at a server to associate subtitles with an identified attribute, in accordance with some embodiments of the disclosure.

FIG. 2B shows another exemplary environment in which a subtitle file is amended at a server to associate subtitles with an identified attribute, in accordance with some embodiments of the disclosure. Again, a user sets an attribute, or attributes, to apply to subtitles generated for display at a first computing device, such as smart television 200. In this example, the user sets a setting to always display subtitles at the bottom of the screen. When a user accesses a media asset from an over-the-top (OTT) provider 214, an associated subtitle file 202 is sent from the OTT provider 214 to a server 210. In some examples, only the subtitle file 202 is sent to the server 210. In other examples, the server 210 sits in between the OTT provider 214 and the smart television 200 and receives the entire media asset that the user is accessing. The server 210 identifies an attribute to apply 204 to the subtitles. In this example, the attribute to apply to the subtitles is position information such that the subtitles are generated for display, and displayed, at the bottom of the screen of the smart television 200. In this example, the server 210 amends the subtitle file to remove any existing position attributes that would cause the subtitles to be displayed at a position other than at the bottom of the screen of the smart television 200 and creates an amended subtitle file 206. The amended subtitle file 206 is sent via a communications network 212 to the smart television 200. In the example where the entire media asset is sent from the OTT provider 214 to the smart television 200, the entire media asset is sent via the communications network 212 to the smart television 200. The communications network 212 may include the internet and/or a local network and may include wired and/or wireless components. The server may cache the amended subtitle file and the amended subtitle file may be served in response to requests from subsequent users. In this example, the amended subtitle file is received at the smart television 200 and is stored in a temporary buffer and discarded once the user has finished accessing the media asset; however, in other examples, the amended subtitle file may be stored on the local storage device and retained once the user has finished accessing the media asset. The smart television 200 generates the subtitles for display and displays the subtitles 208 at the bottom of the screen of the smart television 200. In another example, the user has an application installed on their smart television 200 (or computing device), which enables the smart television 200 (or computing device) to communicate with the server 210. The server 210 is connected to multiple OTT providers and/or over-the-air broadcasters, which the user can select via the application. In this way, a user can set a single attribute to apply to subtitles generated for display at a smart television 200 (or computing device), and this attribute can be applied to the subtitles of any media asset that the user wishes to consume. In some examples, the media content (e.g., video and audio segments) and the subtitle files can already exist (prestored, cached, etc.) on a content delivery network (CDN) and/or edge servers and be readily available to be served to a client (or user) when requested. In such case, the modification (or amendment) of the subtitle files can happen on a component of the CDN and/or edge server. The component of the CDN and/or edge server may cache the amended subtitle file and the amended subtitle file may be served in response to requests from subsequent users.

Figure 3A:
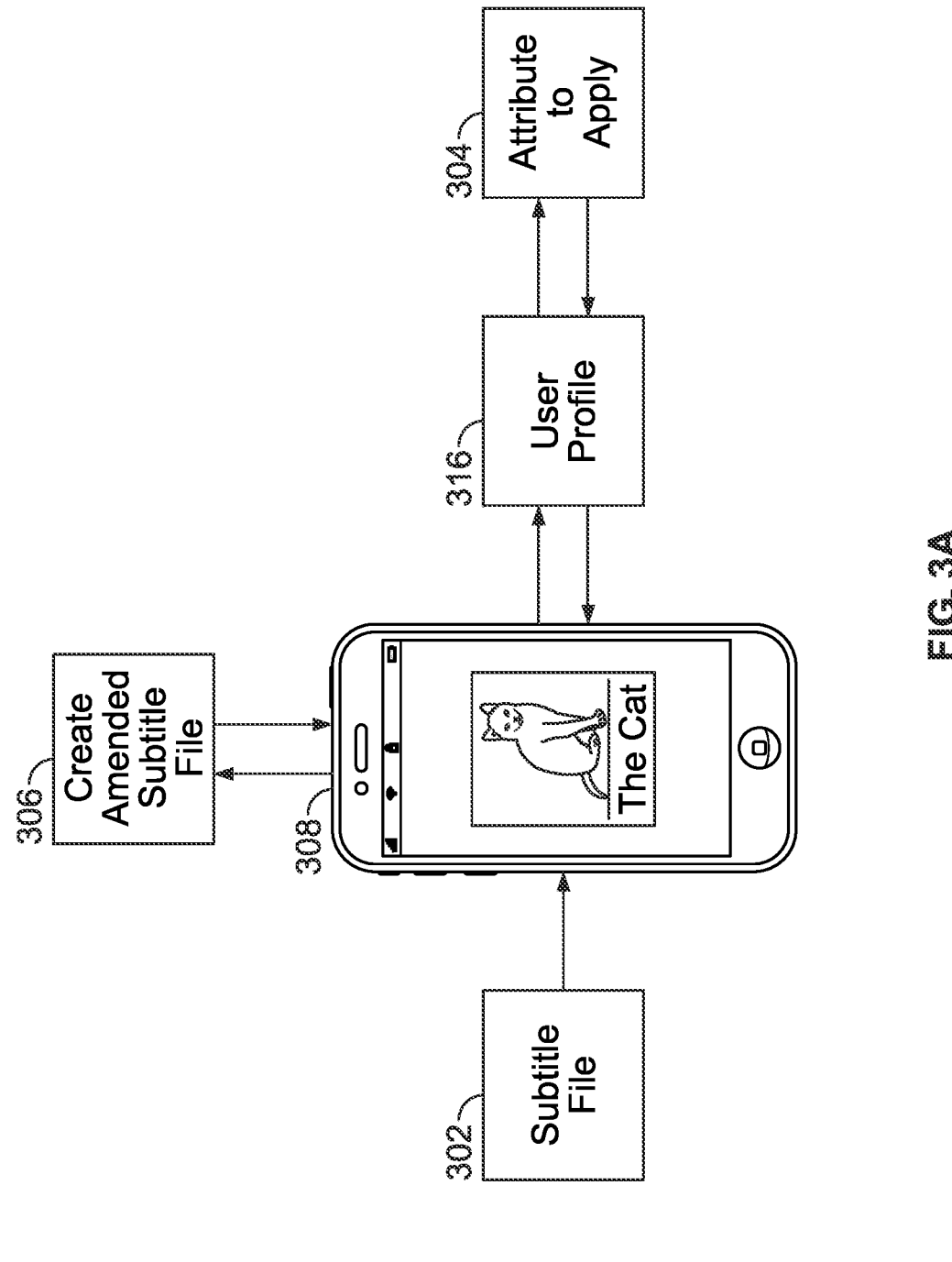
FIG. 3A shows an exemplary environment in which an attribute to apply to subtitles is stored in a user profile and a subtitle file is amended to associate subtitles with an identified attribute, in accordance with some embodiments of the disclosure.

FIG. 3A shows an exemplary environment in which an attribute to apply to subtitles is stored in a user profile and a subtitle file is amended to associate subtitles with an identified attribute, in accordance with some embodiments of the disclosure. A user sets an attribute, or attributes, to apply to subtitles generated for display at a first computing device, such as smartphone 300, in a user profile 316. In this example, the user sets a setting to always display subtitles at the bottom of the screen. When the smartphone 300 receives a subtitle file 302, for example a subtitle file 302 that is associated with a media asset accessed from a memory of the smartphone 300, the smartphone 300 accesses the user profile 316 to identify an attribute to apply 304 to the subtitles. In this example, the user profile 316 is stored locally on the smartphone 300; however, in other examples the user profile 316 may be stored remotely from the smartphone 300, for example, on a server that is accessible via a network such as the internet. In this example, the attribute to apply is to apply position information to the subtitles such that they are generated for display, and displayed, at the bottom of the screen of the smartphone 300. In this example, the smartphone 300 amends the subtitle file to remove any existing position attributes that would cause the subtitles to be displayed at a position other than at the bottom of the screen and creates an amended subtitle file 306. In this example, the amended subtitle file is stored in a temporary buffer and discarded once the user has finished accessing the media asset;

however, in other examples, the amended subtitle file may be stored on a storage of the smartphone 300 and retained once the user has finished accessing the media asset. The smartphone 300 generates the subtitles for display and displays the subtitles 308 at the bottom of the screen of the smartphone 300. An advantage of storing the attribute to apply 304 to the subtitles in a user profile is that each user can indicate their preferred subtitle constructs. For example, multiple users may use the smartphone 300 and may log in to the smartphone (or any other computing device). A first user may wish to disable animations for subtitles, whereas a second user may wish to enable a bold outline on the displayed subtitle text. Instead of having to manually change the subtitle attribute to be applied each time the user uses the smartphone 300 (or any other computing device), when a user logs on to the smartphone 300 (or any other computing device), the smartphone 300 (or any other computing device) may identify a user profile associated with the log-on details, and the attribute to be applied to the subtitles may be identified in the user profile. Another advantage is that the user profile may additionally and/or alternatively be stored on a server and may be retrieved by a computing device that a user logs on to. In this way, a user does not have to manually set the attribute to be applied on each computing device that they use. Rather, when a user logs on to a computing device, the computing device may identify a user profile associated with the log-on details and communicate the user profile to the server. The server may identify the attribute, or attributes, that are stored in the user profile to apply to subtitles and may send the attribute to apply to subtitles to the computing device.

Figure 3B:
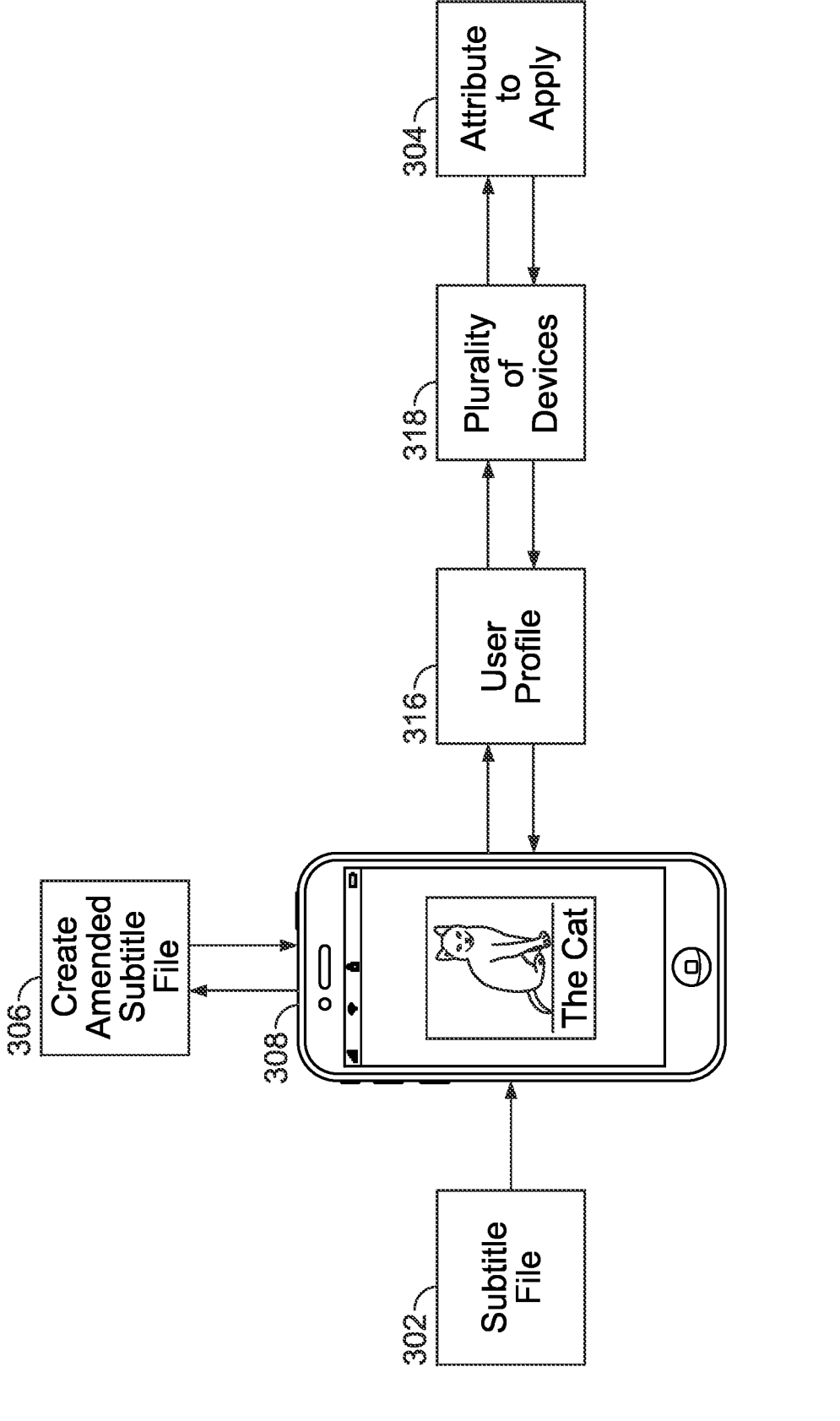
FIG. 3B shows another exemplary environment in which an attribute to apply to subtitles is stored in a user profile and a subtitle file is amended to associate subtitles with an identified attribute, in accordance with some embodiments of the disclosure.

FIG. 3B shows an exemplary environment in which an attribute to apply to subtitles is stored in a user profile and a subtitle file is amended to associate subtitles with an identified attribute, in accordance with some embodiments of the disclosure. The system of FIG. 3B works in substantially the same manner as the system of FIG. 3A; however, a plurality of identifiers identifying different computing devices 318 are also stored in the user profile 316 and an attribute, or attributes, to apply 304 to subtitles are stored with each of the identifiers of the plurality of devices 318. The plurality of identifiers may be used to identify groups of computing devices, such as smart televisions, smartphones and/or tablets. For example, a user may wish to enable animations for all smart televisions associated with the user profile 316; however, a user may wish to disable animations for all smartphones associated with the user profile 316. In another example, the plurality of identifiers may be used to identify specific computing devices, such as a personal smartphone and a work smartphone. The user may wish to enable animations for subtitles on their personal smartphone associated with the user profile 316 and may wish to disable all animations for subtitles on their work smartphone associated with the user profile 316. When the smartphone 300 accesses the user profile 316, the smartphone is identified, for example, as belonging to the group "smartphones," as discussed above, and an attribute to apply to subtitles that corresponds to the smartphone group is identified. As discussed in connection with FIG. 3A, the smartphone amends the subtitle file to apply the identified attribute and creates an amended subtitle file 306. The smartphone 300 displays the subtitles of the amended subtitle file 306 on a display of the smartphone 300. Again, as discussed in connection with FIG. 3A, the user profile including the identifiers for the plurality of devices 318 and the attribute, or attributes, to apply 304 to subtitles may be stored locally on the smartphone 300 (or computing device) and/or on a server remote to the smartphone 300 (or computing device).

Figure 4A:
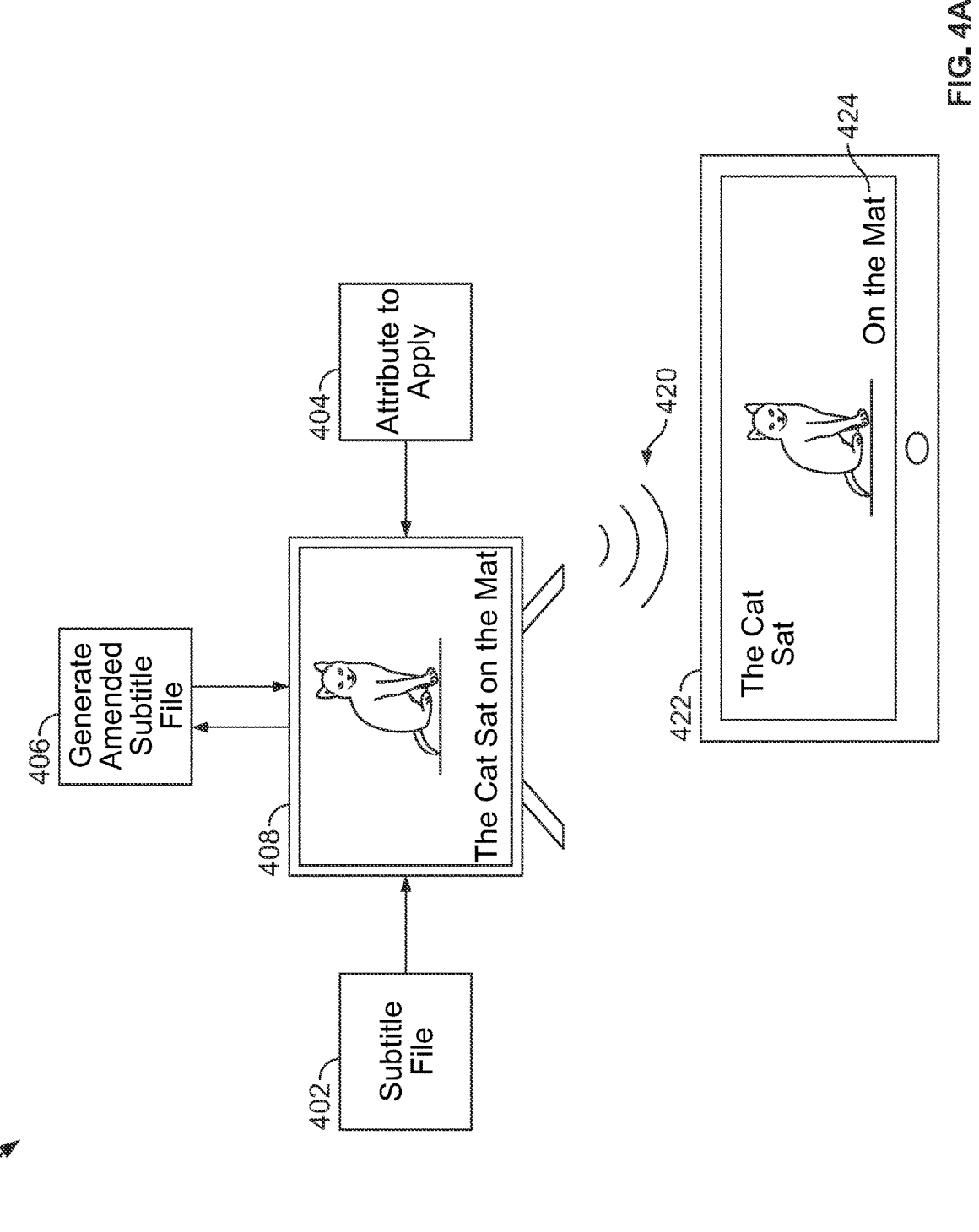
FIG. 4A shows an exemplary environment in which a subtitle file is amended to associate subtitles with an identified attribute and the subtitles are generated for display at a second computing device, in accordance with some embodiments of the disclosure.

FIG. 4A shows an exemplary environment in which a subtitle file is amended to associate subtitles with an identified attribute and the subtitles are generated for display at a second computing device, in accordance with some embodiments of the disclosure. The example environment depicts a first computing device, such as a smart television 400 that is set up to transmit a media asset comprising a subtitle file 402 to a second computing device, such as a tablet 422. A user sets an attribute, or attributes, to apply to subtitles generated for display at the tablet 422. In this example, attribute to apply 404 to the subtitles is set at a smart television 400.

In this example, the user sets a setting to display subtitles 424 at the left and right sides of the screen of the tablet 422, rather than at the bottom of the screen. When the smart television 400 accesses the subtitle file 402, for example, when accessing a media asset from a local storage device, the smart television 400 identifies an attribute to apply 404 to the subtitles. In this example, the attribute to apply to the subtitles is to apply position information to the subtitles such that they are generated for display, and displayed, at the left and right sides of the screen of the tablet 422. In this example, the smart television 400 amends the subtitle file to apply the indicated attribute to the subtitles and creates an amended subtitle file 406. The amended subtitle file 406 is transmitted from the smart television 400 to tablet 422, along with the rest of the media asset. The amended subtitle file 406 and the media asset may be transmitted wirelessly 420 via, for example, a Wi-Fi connection of a home network. The home network may comprise wired and/or wireless components. In other examples, the amended subtitle file 406 and the media asset may be transmitted over a wide area network, such as the internet. The amended subtitle file 406 may be transmitted separately from the rest of the media asset. The tablet 422 generates the subtitles for display and displays the subtitles 424 at the left and right sides of the screen of the tablet 422. The smart television 400 may display the media asset simultaneously, or substantially simultaneously, as the tablet 422 and may make use of the original subtitle file 402. In this example, the subtitles 408 are displayed at the bottom of the display of the smart television 400. In some examples, the smart television 400 and the tablet 422 may independently connect to an over-the-top provider of media content and simultaneously receive the same media content from the over-the-top provider; however, the subtitle file 402 may be amended at the smart television 400 and transmitted to the tablet 422, replacing any subtitles that are received from the over-the-top provider at the tablet 422. In this way, a tablet 422 (or any secondary computing device) with limited computing resources is able to take advantage of improved computing resources that may be available at the smart television 400. Although the above example is described with reference to two computing devices, the example may be expanded to include any number of computing devices that receive an amended subtitle file from the smart television 400.

Figure 4B:
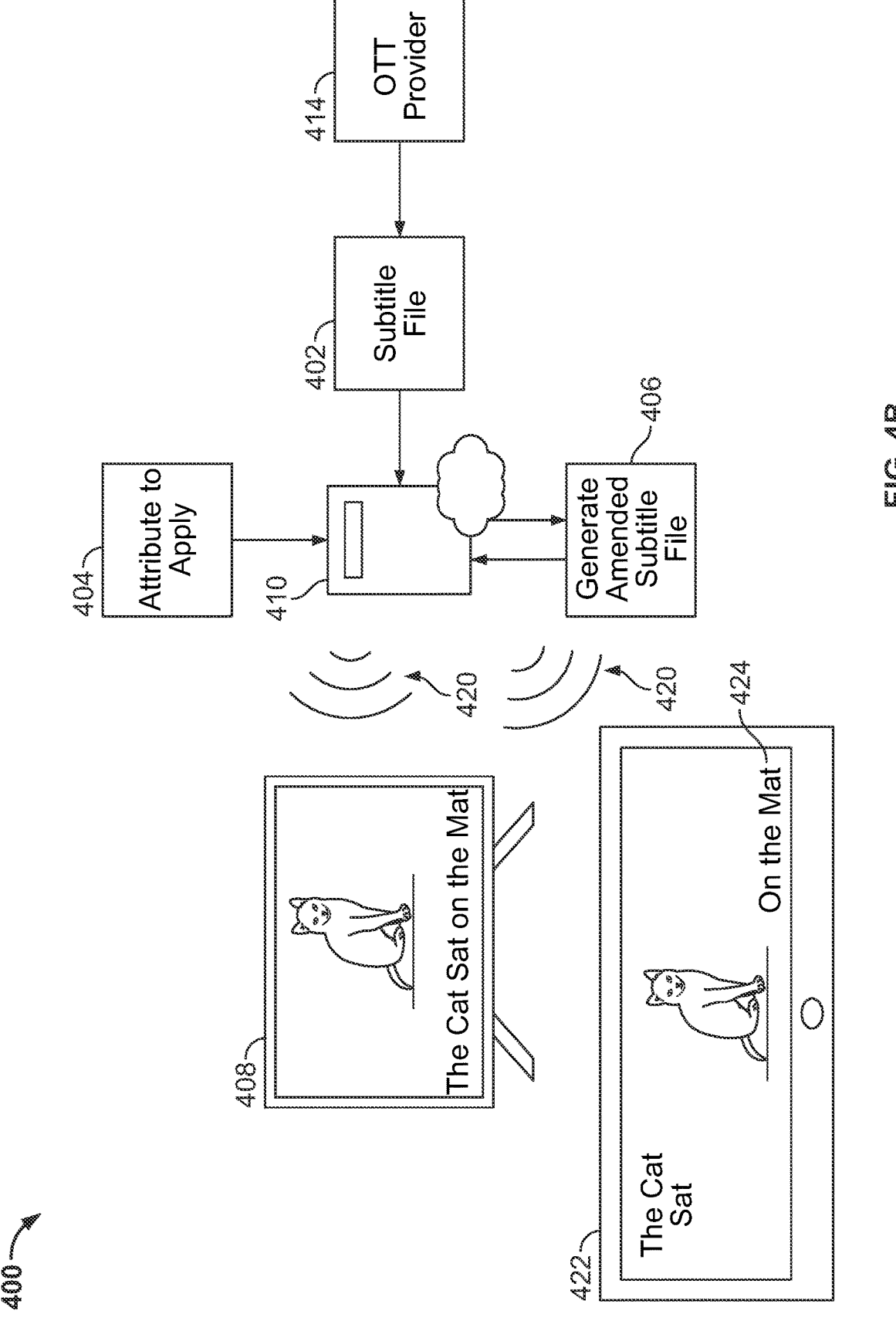
FIG. 4B shows another exemplary environment in which a subtitle file is amended to associate subtitles with an identified attribute and the subtitles are generated for display at a second computing device, in accordance with some embodiments of the disclosure.

FIG. 4B shows another exemplary environment in which a subtitle file is amended to associate subtitles with an identified attribute and the subtitles are generated for display at a second computing device, in accordance with some embodiments of the disclosure. The example environment depicts a first computing device, such as a smart television 400 that receives a media asset from an over-the-top provider 414 via a network, such as the internet, and a second computing device, such as a tablet 422, that receives the same media asset from the over-the-top provider 414 via the network. A user sets an attribute, or attributes, to apply to subtitles generated for display at the tablet 422. In this example, attribute to apply 404 to the subtitles is stored at a server 410. In this example, the server 410 receives the subtitle file 402 of the media asset from the over-the-top provider 414 via the network. In other examples, the server 410 may receive the entire media asset from the over-the-top provider and transmit any video and/or audio parts of the media asset to the smart television 400 and/or the tablet 422. In this example, the user sets a setting to display subtitles 424 at the left and right sides of the screen of the tablet 422. When the server 410 accesses the received subtitle file 402, the server 410 identifies an attribute to apply 404 to the subtitles. In this example, the attribute to apply to the subtitles is position information such that the subtitles are generated for display, and displayed, at the left and right sides of the screen of the tablet 422. In this example, the server 410 amends the subtitle file to apply the indicated attribute to the subtitles and creates an amended subtitle file 406. The amended subtitle file 406 is transmitted from the server 410 to tablet 422 via the network. The server may cache the amended subtitle file and the amended subtitle file may be served in response to requests from subsequent users. The tablet 422 generates the subtitles for display and displays the subtitles 424 at the left and right sides of the screen of the tablet 422. In this example, the user has not set any settings to apply to the subtitles generated for display on the smart television 400, and the server 410 transmits the original subtitle file 402 to the smart television via the network. In other examples, if no settings have been indicated to be applied to the subtitles to be generated for display at a computing device, such as the smart television 400, the computing device may receive the subtitle file 402 directly from the over-the-top content provider. The smart television 400 may display the media asset simultaneously, or substantially simultaneously, as the tablet 422 and make use of the original subtitle file 402. In this example, the subtitles 408 are displayed at the bottom of the display of the smart television 400. In this example, the server 410 acts as a coordinator to coordinate the subtitles and any attributes to be applied to the subtitles, between the two computing devices. Although the above example is described with reference to two computing devices, the example may be expanded to include any number of computing devices, wherein at least a subset of the computing devices receive an amended subtitle file from the server 410.

Figure 5:
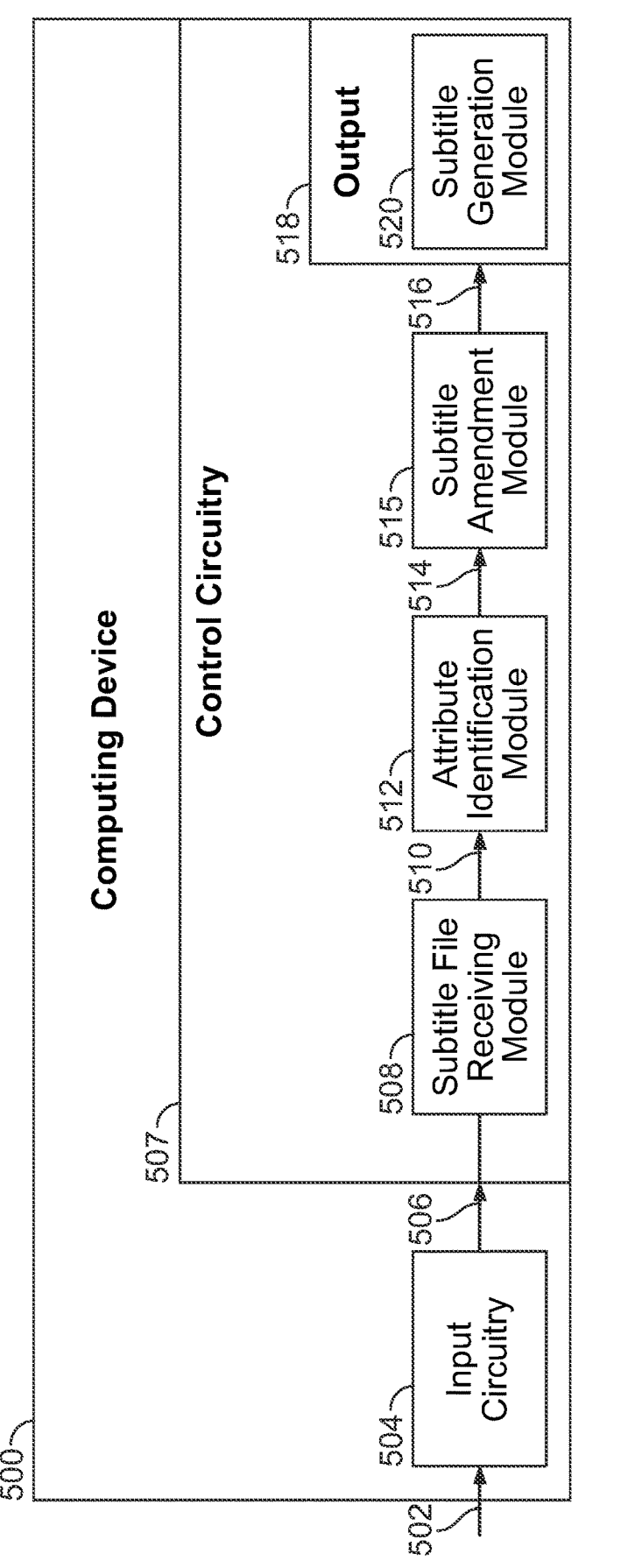
FIG. 5 shows a block diagram representing components of a computing device and data flow therebetween for amending a subtitle file to indicate an attribute to apply to the subtitles, in accordance with some embodiments of the disclosure.

FIG. 5 shows a block diagram representing components of a computing device and data flow therebetween for amending a subtitle file to indicate an attribute to apply to the subtitles, in accordance with some embodiments of the disclosure. Computing device 500 (e.g., a smart television 100, 200, 400, smartphone 300, tablet 422 as discussed in connection with FIGS. 1-4) comprises input circuitry 504, control circuitry 507 and an output module 518. Control circuitry 507 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor). Some control circuits may be implemented in hardware, firmware, or software.

A user provides an input 502 that is received by the input circuitry 504. The input circuitry 504 is configured to receive a user input related to a computing device. For example, this may be via a touchscreen, keyboard, mouse, microphone and/or infra-red controller of the computing device 500. The input circuitry 504 transmits 506 the user input to the control circuitry 507.

The control circuitry 507 comprises a subtitle file receiving module 508, an attribute identification module 512, a subtitle amendment module 515 and an output module 518. The user input is transmitted 506 to the subtitle file receiving module 508. At subtitle file receiving module 508, a subtitle file is received, for example, when the user input comprises selecting a media asset comprising a subtitle file. The subtitle file is transferred 510 to the attribute identification module 512, where the attribute, or attributes, to apply to the at least a subset of the subtitles in the subtitle file are identified. The subtitle file and the identified attribute are transferred 514 to the subtitle amendment module 515, wherein the subtitle file is amended to indicate the attributes to be applied to the at least a subset of subtitles when they are generated for display. The amended subtitle file is transmitted 516 to the output module 518, where the subtitle generation module 520 applies the indicated attribute to the at least a subset of subtitles and generates the subtitles for display.

FIG. 6 shows an example output from an amended subtitle file, in accordance with some embodiments of the disclosure. A first example output 600*a* at a display of a computing device shows how an attribute may be applied to subtitles 602*a*, such that the subtitles are generated for display and are displayed in different parts of the display. A second example output 600*b* at a display of a computing device shows how the subtitles 602*b* may be displayed, i.e., at the bottom of the display, if a subtitle file is amended to remove the aforementioned attribute from the subtitle file.

FIG. 7 shows an example subtitle file format, in accordance with some embodiments of the disclosure. In this example, the Time Text Markup Language (TTML) snippet 700 shows how a subtitle file may be structured, though other subtitle formats fall within the scope of the disclosure.

In the subtitle file, each subtitle has a begin time stamp 702 (or time code) that indicates the relative time, i.e., with respect to the start of the media asset, that the subtitle should be displayed and an end time stamp 704 (or time code) that indicates the relative time that the subtitle should stop being displayed. Each subtitle has a style 706 associated with it. In this example, the style of subtitle 1 is "s1," which indicates that the subtitle should be displayed at 100% size, be in the Arial font and be centrally aligned. Each subtitle also has region 708 associated with it. In this example, subtitle 1 should be displayed at the top of the screen. The text 710 to be displayed for each subtitle is also indicated. In this example, the text is "TOP SAMPLE." The subtitle file may be amended by changing the different attributes 702, 704, 706 and/or 708. For example, the subtitle file could be amended to include additional styles, s2, s3, s4, etc., which may refer to different alignments, fonts and/or size. The style associated with a subtitle may be amended to refer to a different style, such as "s2." The region associated with a subtitle may also be amended, to refer to a different region. Although not shown here, in some examples, the styles may also refer to different colors, backgrounds and/or text borders. A subtitle may be animated, for example, by bringing forward the end time associated with a first subtitle and introducing a second subtitle with the same text, that has a begin time that is the same as the end time of the first subtitle, but with a different color indicated in the style.

In another example, additional identifiers may be inserted into the subtitle file. For example, a "preference index" and/or a "device" identifier may be inserted into the subtitle file. Instead of editing the attributes associated with each individual subtitle, the "preference index" may be used to indicate a global attribute to apply to all of the subtitles of the subtitle file. A computing device may extract the "preference index" from the subtitle file, identify a user preference indicated by the "preference index" and filter out any attributes that do not meet the user preference. For example, the "preference index" may indicate that all subtitles should be generated and rendered at 110% font size, irrespective of the font size indicated with each individual subtitle. The "device" identifier may also be used in combination with the "preference index" to indicate which attributes should applied at a specific device. For example, the "device" identifier may indicate that for computing devices with a display resolution of 1920×1080, the subtitles should be rendered at 80% font size, and for devices a display resolution of 3840×2160, the subtitles should be rendered at 110% font size. The computing device may identify the display resolution of the screen on which the subtitles will be generated for display and identify the attribute to apply to the subtitles. The computing device may then generate the subtitles for display with the attribute, or attributes, that are appropriate for the display of the computing device.

Figure 8:
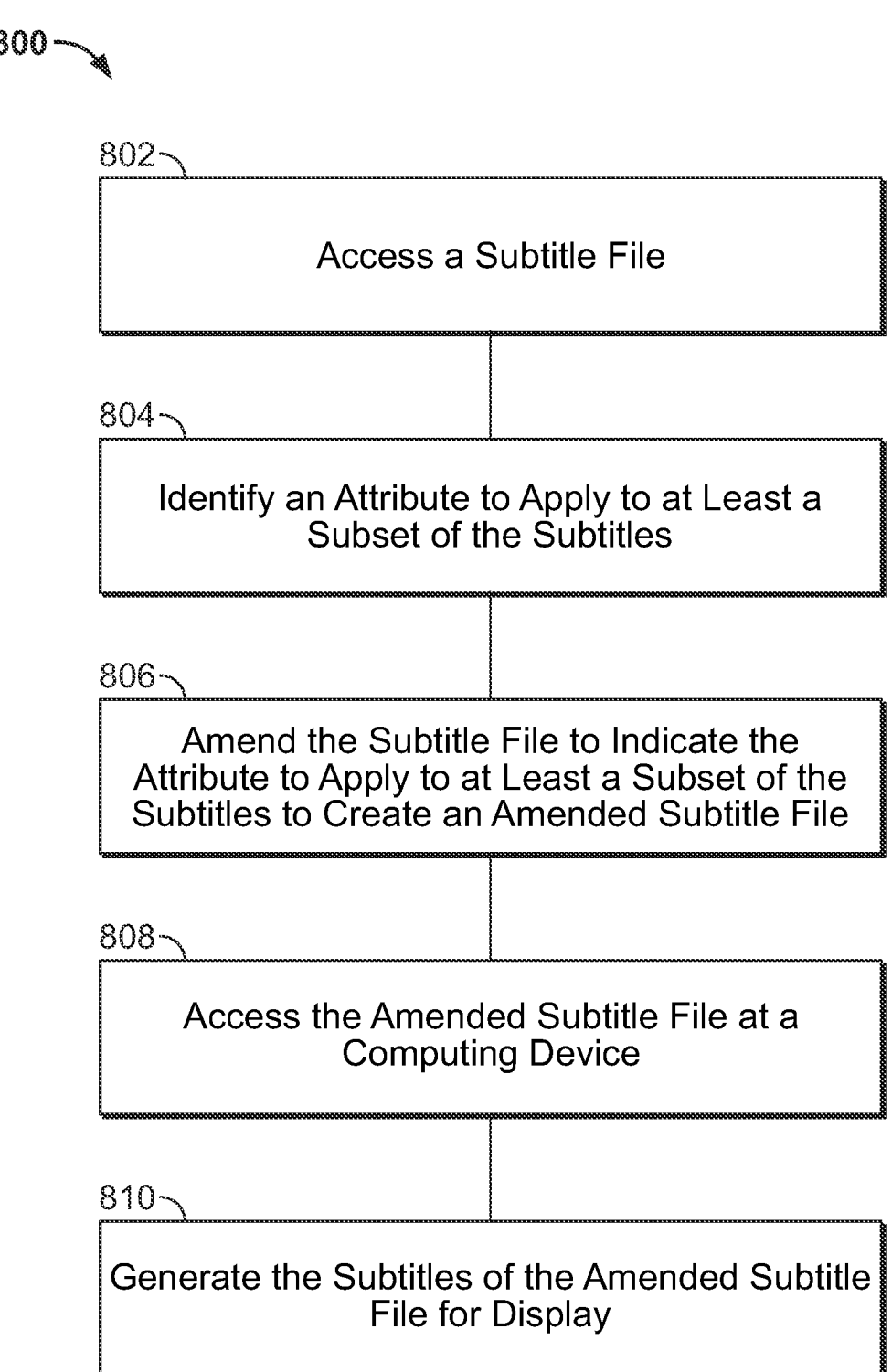
FIG. 8 is a flowchart of illustrative steps involved in applying attributes to subtitles, in accordance with some embodiments of the present disclosure.

FIG. 8 is a flowchart of illustrative steps involved in applying attributes to subtitles, in accordance with some embodiments of the present disclosure. Process 800 may be implemented on an aforementioned computing device 100, 200, 300, 400, 422. In addition, one or more actions of the process 800 may be incorporated into or combined with one or more actions of any other process or embodiments described herein.

At 802, a subtitle file is accessed, wherein the subtitle file comprises one or more subtitles. At 804, an attribute to apply to at least a subset of the subtitles is identified. At 806, the subtitle file is amended to indicate the attribute to apply to at least a subset of the subtitles to create an amended subtitle file. At 808, the amended subtitle file is accessed at a computing device. At 810, the subtitles of the amended subtitle file are generated for display, at a computing device, wherein the attribute is applied to the subset of the subtitles.

FIG. 9 is a flowchart of illustrative steps involved in applying attributes to subtitles at a second computing device, in accordance with some embodiments of the present disclosure.

Process 900 may be implemented on an aforementioned computing device 100, 200, 300, 400, 422. In addition, one or more actions of the process 900 may be incorporated into or combined with one or more actions of any other process or embodiments described herein.

At 902, references to a plurality of computing devices are stored in a user profile. At 904, a first attribute to apply to subtitles generated for display at a first computing device of the plurality of different computing devices is stored in the user profile. At 906, a second attribute to apply to subtitles generated for display at a second computing device of the plurality of computing devices is stored in the user profile. At 908, a subtitle file is accessed. At 910, the computing device at which the subtitles are to be generated for display is identified as the first computing device. At 912, the user profile is accessed to identify the first attribute to apply to the subtitles to be generated for display at the first computing device. At 914, the subtitle file is amended to indicate the attribute to apply to at least a subset of the subtitles to create an amended subtitle file. At 916, the amended subtitle file is accessed at the first computing device. At 918, the subtitles of the amended subtitle file are generated for display, at the first computing device, wherein the attribute is applied to the subset of the subtitles.

FIG. 10 is a flowchart of illustrative steps involved in applying attributes to subtitles, in accordance with some embodiments of the present disclosure. Process 1000 may be implemented on an aforementioned computing device 100, 200, 300, 400, 422. In addition, one or more actions of the process 1000 may be incorporated into or combined with one or more actions of any other process or embodiments described herein.

As discussed in connection with FIG. 7 above, additional identifiers may be inserted into the subtitle file, for example a "preference index" identifier and a "device" identifier. At 1002, a preference index is extracted from a stream, such as a streamed media asset comprising a subtitles file. At 1004, a recommended screen is extracted, as indicated by the "device" identifier. At 1006, user preferences are identified from the extracted preference index. At 1008, any subtitle constructs that are indicated in the subtitle file but do not meet the identified user preferences are filtered out. At 1010, a set of subtitles are generated for display, at a computing device, in accordance with the user preferences.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving a request to consume a content item from a first computing device;
accessing a subtitle file comprising one or more subtitles and an animation attribute to apply to a subset of the subtitles;
identifying, at a second computing device, a type of the first computing device from which the request was received;
determining, at the second computing device and based at least in part on the identified type being that of a portable type, that the animation attribute is to be disabled; and
in response to the determining:
transmitting, by the second computing device, an amended subtitle file that does not comprise the animation attribute of the subtitle file for consumption with the content item by the first computing device, wherein the amended subtitle file comprises a modified version of the subtitle file, to cause the first computing device to generate the subtitles of the amended subtitle file for display without animation that would otherwise be presented based on the animation attribute.

2. The method of claim 1, wherein:
the subtitle file further comprises an original attribute to apply to at least a subset of the one or more subtitles;
the method further comprises:
parsing the subtitle file to identify the original attribute;
determining, based at least in part on the identified type being that of a portable type, that the original attribute is to be disabled; and
removing the original attribute from the subtitles to create the amended subtitle file.

3. The method of claim 1, wherein:
the second computing device is a server;
the subtitle file is amended at the second computing device; and
transmitting the amended subtitle file comprises transmitting the amended subtitle file via a network.

4. The method of claim 3, further comprising receiving the amended subtitle file at the second computing device from an over-the-top content provider.

5. The method of claim 1, wherein the animation attribute includes at least one of: a content element attribute, a timing attribute, a style attribute, a layout attribute, a metadata attribute, a color attribute, a font size attribute, a font weight attribute or a text alignment attribute.

6. The method of claim 1, wherein:
the method further comprises storing the type for which the animation attribute is to be disabled in a user profile; and
determining that the animation attribute is to be disabled further comprises accessing the user profile to identify the type for which the animation attribute is to be disabled.

7. The method of claim 1, further comprising disabling a subtitle attribute for dialogue and enabling a subtitle attribute for sound effects.

8. The method of claim 1, wherein the method further comprises:
transmitting the amended subtitle file to a plurality of content item consumption devices;

accessing the amended subtitle file at each of the plurality of content item consumption devices; and generating the subtitles of the amended subtitle file for display at the plurality of content item consumption devices.

9. The method of claim 1, wherein:

the method further comprises identifying an attribute to be disabled for a content provider; and transmitting the amended subtitle file further comprises transmitting the amended subtitle file without the attribute to be disabled for the content provider.

10. The method of claim 1, wherein the first computing device is a client computing device and the second computing device is a server.

11. A system comprising:

input circuitry configured to:

receive a request to consume a content item from a first computing device; and processing circuitry configured to:

access a subtitle file comprising one or more subtitles and an animation attribute to apply to a subset of the subtitles;

identify, at a second computing device, a type of the first computing device from which the request was received;

determine, at the second computing device and based at least in part on the identified type being that of a portable type, that the animation attribute is to be disabled; and in response to the determining, transmit, by the second computing device, an amended subtitle file that does not comprise the animation attribute of the subtitle file for consumption with the content item by the first computing device, wherein the amended subtitle file comprises a modified version of the subtitle file, to cause the first computing device to generate the subtitles of the amended subtitle file for display without animation that would otherwise be presented based on the animation attribute.

12. The system of claim 11, wherein:

the subtitle file further comprises an original attribute to apply to at least a subset of the one or more subtitles;

the processing circuitry is further configured to:

parse the subtitle file to identify the original attribute;

determine, based at least in part on the identified type being that of a portable type, that the original attribute is to be disabled; and remove the original attribute from the subtitles to create the amended subtitle file.

13. The system of claim 11, wherein:

the second computing device is a server;

the subtitle file is amended at the second computing device; and the processing circuitry configured to transmit the amended subtitle file is further configured to transmit the amended subtitle file via a network.

14. The system of claim 13, wherein the input circuitry is further configured to receive the amended subtitle file at the second computing device from an over-the-top content provider.

15. The system of claim 11, wherein the animation attribute includes at least one of: a content element attribute, a timing attribute, a style attribute, a layout attribute, a metadata attribute, a color attribute, a font size attribute, a font weight attribute or a text alignment attribute.

16. The system of claim 11, wherein:

the system further comprises processing circuitry configured to store the type for which the animation attribute is to be disabled in a user profile; and the processing circuitry configured to determine that the animation attribute is to be disabled is further configured to access the user profile to identify the type for which the animation attribute is to be disabled.

17. The system of claim 11, wherein the processing circuitry is further configured to disable a subtitle attribute for dialogue and enable a subtitle attribute for sound effects.

18. The system of claim 11, wherein the processing circuitry is further configured to:

transmit the amended subtitle file to a plurality of content item consumption devices;

access the amended subtitle file at each of the plurality of content item consumption devices; and generate the subtitles of the amended subtitle file for display at the plurality of content item consumption devices.

19. The system of claim 11, wherein:

the system further comprises processing circuitry configured to identify an attribute to be disabled for a content provider; and the processing circuitry configured to transmit the amended subtitle file is further configured to transmit the amended subtitle file without the attribute to be disabled for the content provider.

20. The system of claim 11, wherein the first computing device is a client computing device and the second computing device is a server.

* * * * *